US008910192B2

(12) United States Patent
Groff et al.

(10) Patent No.: US 8,910,192 B2
(45) Date of Patent: Dec. 9, 2014

(54) APPLICATION PROGRAMMING INTERFACES FOR TRANSACTED FILE AND REGISTRY OPERATIONS

(75) Inventors: Dana Groff, Sammamish, WA (US);
Jonathan Cargille, Seattle, WA (US);
Surendra Verma, Bellevue, WA (US);
Andrew Herron, Redmond, WA (US);
Dragos Sambotin, Issaquah, WA (US);
Christian Allred, Snohomish, WA (US);
William R. Tipton, Seattle, WA (US);
Karthik Thirumalai, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 11/890,921

(22) Filed: Aug. 8, 2007

(65) Prior Publication Data

US 2009/0044204 A1 Feb. 12, 2009

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/54* | (2006.01) | |

(52) U.S. Cl.
CPC . *G06F 9/54* (2013.01); *G06F 9/466* (2013.01)
USPC ............ 719/328; 719/313; 719/318; 719/320

(58) Field of Classification Search
None
See application file for complete search history.

(56) References Cited

U.S. PATENT DOCUMENTS

| | | | |
|---|---|---|---|
| 5,987,517 A | 11/1999 | Firth et al. | |
| 6,061,693 A | 5/2000 | Carney et al. | |
| 6,389,427 B1 | 5/2002 | Faulkner | |
| 6,550,061 B1 | 4/2003 | Bearden et al. | |
| 6,567,828 B2 | 5/2003 | Inohara et al. | |
| 6,681,265 B1 | 1/2004 | Hlava | |
| 2002/0178271 A1 | 11/2002 | Graham et al. | |
| 2004/0128556 A1* | 7/2004 | Burnett | 713/201 |
| 2005/0091502 A1* | 4/2005 | Cargille et al. | 713/182 |

(Continued)

OTHER PUBLICATIONS

Jim-Johnson, A Vista update: integration between System.Transactions and the transacted file system and registry, Aug. 31, 2006 pp. 1 and 2.*
Nell Dale, C+30 Data Structures, 2003, Jones and Bartlett Publishers, Third Edition, p. 91.*
Leach, A Common Internet File System, Dec. 19, 1997, fto,samba.org, 1-4, 25-26, 128-129.*

(Continued)

*Primary Examiner* — Hyung Sough
*Assistant Examiner* — Craig Dorais
(74) *Attorney, Agent, or Firm* — John Jardine; Kate Drakos; Mickey Minhas

(57) ABSTRACT

A set of application programming interfaces ("APIs") is provided that enables an application to perform operations on multiple system resources as a single logical unit of work through a transaction. The application can then commit or roll back the entire group of changes as a single unit in a coordinated manner. The APIs expose functions and methods that take a reference to a transaction context, such as a handle, name, or pointer, as one of their parameters so that the application can manipulate the resource as a transacted operation. The transaction is bound to all created handles so that all operations on the resource using those handles are also transacted. In an illustrative example, the set of APIs are transacted name-based WIN32 APIs that take a transaction handle. The transacted APIs expose transacted operations to the application for durable system resources in the OS kernel, including the NTFS file system (New Technology File System) and registry.

20 Claims, 3 Drawing Sheets

(56) References Cited

U.S. PATENT DOCUMENTS

| | | |
|---|---|---|
| 2005/0120059 A1* | 6/2005 | Verma et al. .................. 707/200 |
| 2006/0161536 A1 | 7/2006 | Faiman et al. |
| 2006/0200861 A1* | 9/2006 | Godbole et al. ................ 726/22 |
| 2006/0259949 A1 | 11/2006 | Schaefer et al. |
| 2007/0078819 A1 | 4/2007 | Zayas et al. |

OTHER PUBLICATIONS

Elia, Mar Darren, "Monitoring and Troubleshooting the Registry", Date: Oct. 2000, Windows IT Library, http://www.windowsitlibrary.com/Content/313/1.html.

Hall, Peter, "Local File Access API Proposal", http://www.peterjoel.com/ActionScript/fileAccessAPI.html.

* cited by examiner

FIG. 4

| TRANSACTED APIs | NON-TRANSACTED APIs |
|---|---|
| CopyFileTransacted | CopyFileEx |
| CreateDirectoryTransacted | CreateDirectoryEx |
| CreateFileTransacted | CreateFile |
| CreateHardLinkTransacted | CreateHardLink |
| CreateSymbolicLinkTransacted | CreateSymbolicLink |
| DeleteFileTransacted | DeleteFile |
| FindFirstFileTransacted | FindFirstFile |
| FindFirstFileNameTransactedW | FindFirstFileNameW |
| FindFirstStreamTransactedW | FindFirstFileStreamW |
| GetCompressedFiledSizeTransacted | GetCompressedFileSize |
| GetFileAttributesTransacted | GetFileAttributes |
| GetFullPathNameTransacted | GetFullPathName |
| GetLongPathNameTransacted | GetLongPathName |
| MoveFileTransacted | MoveFile |
| RemoveDirectoryTransacted | RemoveDirectory |
| SetFileAttributesTransacted | SetFileAttributes |

205

405

APPLICATION PROGRAMMING INTERFACES FOR TRANSACTED FILE AND REGISTRY OPERATIONS

BACKGROUND

Transaction-based methodologies have long been applied to databases so that transactions with fully ACID semantics are exposed. This provides the ability to perform actions on database objects that are fully Atomic, Consistent, Isolated and Durable so that database operations can be processed predictably and reliably even in face of intermittent failures. Transactions are commonly utilized in application that require consistency and reliability, such as financial account management as well as system recovery and restoration situations so that the system may be brought back to the state in which it was operating before the occurrence of a system failure, a power loss, or some other problem. Popular databases supporting transactions include Microsoft SQL Server and Oracle. More recently, other systems have been implemented that use transactions, for example, those including Microsoft Message Queuing ("MSMQ") and the Distributed Transaction Coordinator ("DTC") in the Microsoft Windows® operating systems.

While current transactional infrastructure provides significant benefits, and many transaction-based systems and applications generally work well together, there is no existing way to coordinate all operations going to disk as a single unit of work across all durable resources including both the file system and registry. That is, updates to file system and registry cannot be coordinated, and updates to other resource managers such as SQL Server cannot presently be coordinated with file and registry operations.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A set of application programming interfaces ("APIs") is provided that enables a transaction client (e.g., an application) to perform operations on multiple system resources as a single logical unit of work through a transaction. The application can then commit or roll back the entire group of changes as a single unit in a coordinated manner. The APIs expose functions and methods that take a reference to a transaction context, such as a handle, name, or pointer, as one of their parameters so that the application can manipulate the resource as a transacted operation. The transaction is bound to all created handles so that all operations on the resource using those handles are also transacted.

In an illustrative example, the set of APIs are transacted name-based WIN32 APIs used in the Microsoft Windows® operating system ("OS") environment that take a transaction handle to transact the APIs. The transacted APIs expose transacted operations to the application for durable system resources in the OS kernel, including the NTFS file system (New Technology File System) and registry. The OS kernel utilizes transaction infrastructure that allows services to be provided to transactional resources, including Transactional NTFS ("TxF") and Transactional Registry ("TxR"), to enable operations to be performed within the context of a transaction that is implemented as a kernel object via a Kernel Transaction Manager ("KTM").

TxF and TxR support respective functions or methods to transact operations on the file system or registry that take a name. The WIN32 APIs expose explicit transacted functions or methods for the operations. TxF and TxR can each bind handles to a transaction. The application uses the handle in subsequent calls through the WIN32 APIs to access or modify the file system and registry resources so that all operations—moves, copies, modifications, etc.—on that handle are themselves transacted.

The transacted WIN32 APIs extend existing functionalities provided by non-transacted named APIs through a syntax by which the keyword "Transacted" is appended to the name of the function or method. A transacted API takes a kernel transaction handle as an explicit parameter. Thus, for example, instead of calling CreateFile, when CreateFileTransacted is called, a transacted file handle is generated which can be used for all file operations requiring a handle (where, as noted above, all these file operations are also transacted). The syntax enables the transacted APIs to be readily discoverable.

The present arrangement advantageously enables developers to create more reliable applications using a transactional infrastructure that coordinates multiple operations being performed on system resources. With the transacted APIs, TxF, and TxR, developers can have atomic file operations that result in consistent file data, ease the test burden by reducing the number of error conditions to test for, and assist in multi-user environments by providing isolation via ACID transaction semantics. In addition, current on-disk structures for the file system and registry are maintained without needing to be modified to support transacted file and registry operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 4 shows a set of transacted APIs and their non-transacted counterparts.

Like reference numerals indicate like elements in the drawings.

DETAILED DESCRIPTION

Figure 1:
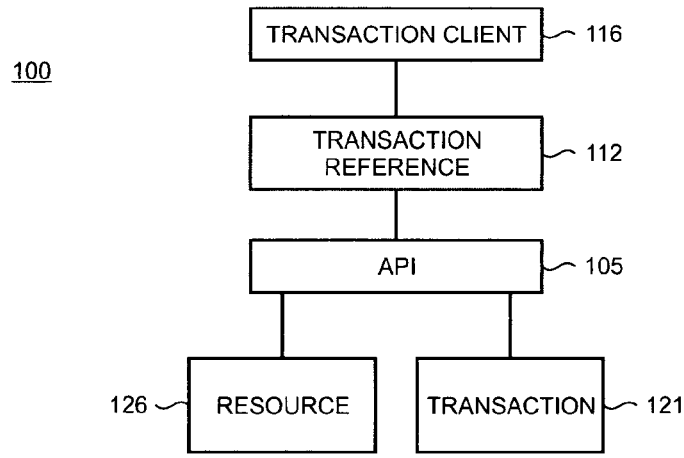
FIG. 1 shows an illustrative transacted resource environment in which a transaction API exposes a transaction reference to a client to associate a transaction with a system resource.

A transaction is a group of operations that have the following properties: atomic, consistent, isolated, and durable (ACID). The support of transactions enables new types of applications to be developed, while simplifying the development process and making the application more robust. In an atomic group of operations, either every operation in the group must succeed, or the effects of all of them must be undone (also known as "rolling back"). For example, a bank transfer must be an atomic set of two operations: a debit from one account and a credit to another account. The debit and credit must be implemented as an atomic group. If those two operations do not both succeed, then the transfer is either unfairly in favor of the bank or the account holder.

The requirement of consistency means that the data is consistent after the transaction (assuming that a consistent system was in place before the transaction). For the bank transfer example above, consistency may be defined as having the combined account balance of the two accounts be a constant. To implement consistency in the bank transfer example, the debit and credit operations simply need to be for the same amount of money.

Another example of a transaction is an update to a Web site. An electronic commerce site requires that a new product category navigation page to appear at exactly the same time as the product detail pages that describe the new products. In this case, there is a need to update and add multiple directory entries under the control of a transaction. Not only is it necessary to have the updates be atomic, but it is also necessary that a customer who is currently shopping must not see the updates in progress. This is an example of the isolation property of transactions.

The property of durability requires that after an update is finished, its effects persist even if the system stops responding. In the previous example, durability can be provided simply by ensuring adequate data recovery so that all new file system entries that represent the addition of a new product to the site appear after a system stops responding. This requires a system with data backup, recovery, and high availability mechanisms.

The guarantee of the atomicity of a transaction, as well as the other properties, is present in the face of any number of failures, including failures that occur during the recovery phase of a prior failure. Eventually the system will reach either one of two states: all operations have been applied or none of the operations have been applied.

The properties of a transaction are summarized in the table below.

TABLE

| Property | Description |
|---|---|
| Atomic | Either all of the operations in the transaction succeed or none of the operations persist. |
| Consistent | If the data are consistent before the transaction begins, then they will be consistent after the transaction finishes. |
| Isolated | The effects of a transaction that is in progress are hidden from all other transactions. |
| Durable | When a transaction finishes, its results are persistent and will survive a system crash. |

These properties ensure that a software application can, for example, handle unexpected errors, because it can simply abort a transaction when an unexpected situation occurs such as a system failure or power outage that prevents a successful completion. The transaction infrastructure ensures that all the effects of the aborted transaction are rolled back, returning the data to a consistent state. Thus, a transactional system enables a graceful recovery from system failures.

FIG. 1 shows an illustrative transacted resource environment 100 in which a transacted API 105 takes a transaction reference 112 as a parameter so that a transaction client 116 may associate a transaction 121 with a system resource 126. The transaction reference 112 is bound to the transaction 121 to enable the transaction client to perform an operation of some kind on the resource 126 that is transacted with ACID semantics. The transaction reference essentially functions as a pointer in a shared address space that enables the transaction client, as well as other applications, threads, processes etc. operating in the environment 100 to commonly access or manipulate the resource 126.

As noted above, transactions have commonly been utilized in database environments. Here, the system resource can include both durable resources (e.g., those involving operations on objects such as a flush to disk) and volatile resources (e.g., those involving operations on objects in memory), and is thus not limited to databases. In addition, while the resource 126 is typically system-level resources in the OS kernel, the present arrangement using a transacted API is not necessarily limited to processes, objects, and resources that are bound to one mode or the other (i.e., user mode or kernel mode). The transaction client 116 is typically a user application, although it can also be a thread or process in more general terms that wants to deal with the resource 126 in a transacted manner.

Figure 2:
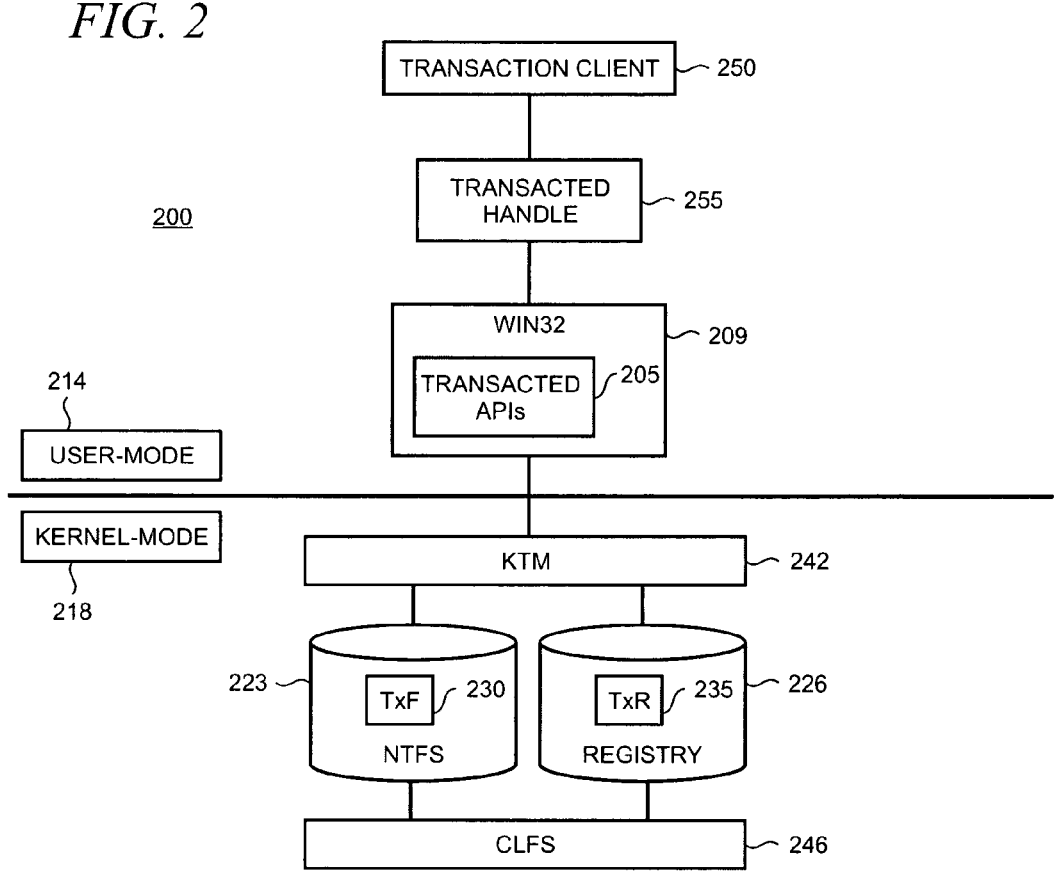
FIG. 2 shows an illustrative transacted resource environment in which transacted APIs in WIN32 expose transacted functions and methods for manipulating durable system resources including the file system and registry.

While FIG. 1 provides a generalized expression of the present APIs for transacted file and registry operations, FIG. 2 provides one specific illustrative implementation using a Microsoft Windows operating system environment 200. The OS here may be implemented, for example, in Microsoft Windows Vista™ and Windows Server® 2008 (formerly known by its codename "Longhorn"). It is noted, however, that the arrangement shown in FIG. 2 and described in the accompanying text is merely illustrative as the present transacted APIs are not limited to the Microsoft Windows OS environments.

In FIG. 2, a set of transacted APIs 205 are configured as part of the WIN32 API 209 which operates in user-mode 214. In the kernel 218, system resources include the NTFS file system 223 and registry 226. Transactional resource managers called Transactional NTFS 230 ("TxF") and Transactional Registry ("TxR") 235 respectively enable transacted file system operations on the NTFS file system 223 and transacted registry operations in the registry 226. A Kernel Transaction Manager 242 ("KTM") makes transactions available as kernel objects and provides transaction management services to TxF 230 and TxR 235.

A Common Log File System ("CLFS") 246 is also used in the environment 200. CLFS is an API that implements a general purpose log file subsystem in the Windows OS that is capable of being used to log transactions for user-mode applications. CLFS is currently supported under Microsoft Windows Server 2003 R2, Windows Server 2008, and Windows Vista operating systems.

The transacted APIs 205 expose a handle-based interface to the system resources (e.g., NTFS 223 and registry 226) in the kernel. Accordingly, to work with the system resource, a transaction client 250 requests a handle 255 to the system resource, and then uses this handle in subsequent function calls to access or modify the system resource.

Figure 3:
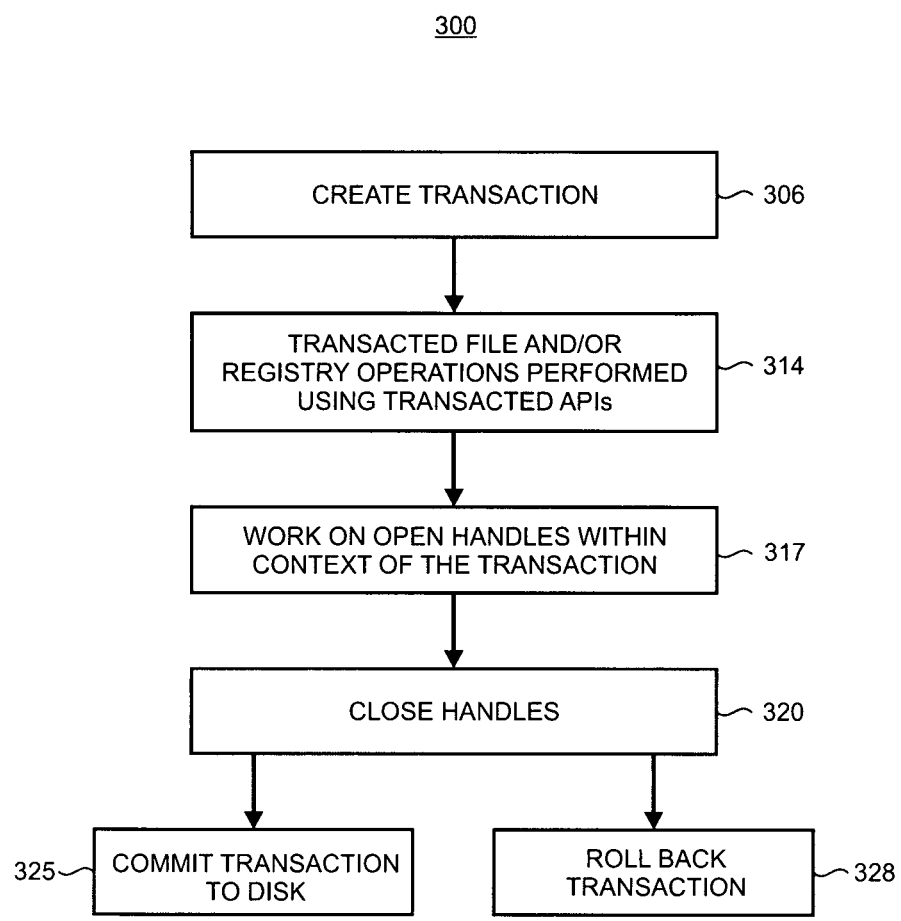
FIG. 3 shows a flowchart for an illustrative method for implementing transacted operations on a file system or registry.

FIG. 3 shows a flowchart for an illustrative method 300 used by the WIN32 and KTM infrastructure shown in FIG. 2 for implementing transacted operations on a file system or registry. At block 306, a transaction is created which, in this illustrative example in the Windows environment is implemented through the KTM API by calling the function CreateTransaction. When CreateTransaction is invoked, a new transaction object is created in the kernel.

At block 314, various work including transacted file and/or registry operations is performed by calling one or more functions and methods provided by the transacted APIs listed in FIG. 4 below and described in the accompanying text. The transacted APIs take a handle to the transaction object created in the step above as one of its parameters to access or manipulate the object as a transacted operation. At block 317, work is performed on all open transaction handles within the transaction context so that all operations to the disk can be coordinated across multiple applications, threads, processes etc., as a single unit of work.

At block 320, the transaction handles may be closed prior to the transacted operations either being committed to disk at block 325 or rolled back at block 328. After a transaction is completed, the transaction handles associated with that transaction are no longer usable.

FIG. 4 shows a set of transacted APIs 205 (FIG. 2) and their conventional non-transacted WIN32 counterparts 405. As shown, transacted APIs follow the syntax of the existing non-transacted named APIs by adding the keyword "Transacted" to the name of the function or method. This enables the transacted APIs to be readily discoverable since their non-transacted counterparts are already well known. The transacted APIs take a kernel transaction handle as an explicit parameter.

In conformance with common practice, both ANSI (American National Standards Institute) and Unicode versions are supported, as well as a version that is dynamically selectable. Using the CopyFileTransacted API as an example, its ANSI version is CopyFileTransactedA and its Unicode version is CopyFileTransactedW. CopyFileTransacted exposes methods for copying an existing file to a new file as a transacted operation which notifies the application of its progress through a callback function. Its header file is expressed as follows where the parameter hTransaction is a handle to the transaction:

```
WINBASEAPI
BOOL
WINAPI
CopyFileTransactedA(
    __in        LPCSTR lpExistingFileName,
    __in        LPCSTR lpNewFileName,
    __in_opt    LPPROGRESS_ROUTINE lpProgressRoutine,
    __in_opt    LPVOID lpData,
    __in_opt    LPBOOL pbCancel,
    __in        DWORD dwCopyFlags,
    __in        HANDLE hTransaction
    );
WINBASEAPI
BOOL
WINAPI
CopyFileTransactedW(
    __in        LPCWSTR lpExistingFileName,
    __in        LPCWSTR lpNewFileName,
    __in_opt    LPPROGRESS_ROUTINE lpProgressRoutine,
    __in_opt    LPVOID lpData,
    __in_opt    LPBOOL pbCancel,
    __in        DWORD dwCopyFlags,
    __in        HANDLE hTransaction
    );
#ifdef UNICODE
#define CopyFileTransacted    CopyFileTransactedW
#else
#define CopyFileTransacted    CopyFileTransactedA
#endif // !UNICODE
```

The other parameters in the CopyFileTransacted function are used in the same way as its existing non-transacted CopyFileEx counterpart, specifically: lpExistingFileName is the name of an existing file; lpNewFileName is the name of the new file; lpProgressRoutine is the address of a callback function LPPROGRESS_ROUTINE that is called each time another portion of the file has been copied; lpData is the argument to be passed to the callback function; pbCancel provides a flag that if set to TRUE during the copy operation, the operation is canceled, otherwise the copy operation will continue to completion; dwCopyFlags provide flags that specify how the file is to be copied.

The other transacted APIs in the set 205 follow the same pattern by which a transacted API takes the transaction handle parameter, hTransaction, to thereby transact that API and extend the functionality of its existing non-transacted counterpart. The notable exception to this pattern is CreateFileTransacted which optionally adds a miniversion as well as an extended parameter:

```
WINBASEAPI
__out
HANDLE
WINAPI
CreateFileTransactedA(
    __in        LPCSTR lpFileName,
    __in        DWORD dwDesiredAccess,
    __in        DWORD dwShareMode,
    __in_opt    LPSECURITY_ATTRIBUTES lpSecurityAttributes,
    __in        DWORD dwCreationDisposition,
    __in        DWORD dwFlagsAndAttributes,
    __in_opt    HANDLE hTemplateFile,
    __in        HANDLE hTransaction,
    __in_opt    PUSHORT pusMiniVersion,
    __reserved PVOID    lpExtendedParameter
    );
WINBASEAPI
__out
HANDLE
WINAPI
CreateFileTransactedW(
    __in        LPCWSTR lpFileName,
    __in        DWORD dwDesiredAccess,
    __in        DWORD dwShareMode,
    __in_opt    LPSECURITY_ATTRIBUTES lpSecurityAttributes,
    __in        DWORD dwCreationDisposition,
    __in        DWORD dwFlagsAndAttributes,
    __in_opt    HANDLE hTemplateFile,
    __in        HANDLE hTransaction,
    __in_opt    PUSHORT pusMiniVersion,
    __reserved PVOID    lpExtendedParameter
    );
#ifdef UNICODE
#define CreateFileTransacted    CreateFileTransactedW
#else
#define CreateFileTransacted    CreateFileTransactedA
#endif // !UNICODE
```

The Miniversion is a TxF feature by which a state of the current changes is saved as a checkpoint. CreateFileTransacted takes a miniversion as a parameter to open a file to a specific saved checkpoint. As shown above, the lpExtendedParameter is reserved for future use.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method performed using an application programming interface for exposing a name-based transacted function that is applicable to a resource, the method comprising the steps of:

taking a filename as an explicit parameter to the name-based transacted function so that a transaction is performed only when the filename is taken as an explicit parameter, the name-based transacted function using fully ACID (atomic, consistent, isolated, durable) semantics;

creating a transacted handle to the resource, the transacted handle being bound to the transaction so that all operations performed on the transacted handle are transacted; and exposing the transacted handle to a transaction client so that the transaction client may modify the resource through the transacted handle, or access the resource through the transacted handle.

2. The method of claim 1 in which the resource is one of durable resource including file system or registry, or volatile resource implemented in memory.

3. The method of claim 1 in which the transacted function is a name-based function.

4. The method of claim 3 in which the transacted function uses a syntax by which the expression "Transacted" is added to a name of the name-based function.

5. The method of claim 3 in which the transacted function provides extended functionality to the named-based function, the extended functionality including transactions.

6. The method of claim 1 in which the function provides a miniversion.

7. A method for performing a name-based transacted function on a durable resource, the method comprising the steps of:

invoking the name-based transacted function to perform a transaction, the name-based transacted function using fully ACID (atomic, consistent, isolated, durable) semantics, and the transaction being performed only when a filename is taken as an explicit parameter by the named-based transacted function;

receiving a transacted handle to a transaction object, the transacted handle being arranged to transact operations that use the transacted handle; and using the transacted handle to modify the durable resource, or access the durable resource.

8. The method of claim 7 including a further step of passing the transaction to a resource manager, the resource manager being arranged to manage transactions applicable to the durable resource.

9. The method of claim 7 in which the function to perform the transaction is implemented by a transaction manager, the transaction manager being arranged as a kernel-mode application programming interface ("API").

10. The method of claim 7 in which the durable resource is a file system.

11. The method of claim 7 in which the durable resource is a registry.

12. The method of claim 8 in which the passing is performed using a transacted API.

13. The method of claim 12 in which the transacted API is a WIN32 API.

14. The method of claim 7 including a further step of invoking a function to commit the transaction.

15. The method of claim 7 including a further step of invoking a function to roll back the transaction.

16. A computer-readable storage medium, not comprising a propagated signal, containing instructions which, when executed by one or more processors disposed in an electronic device, implement a computer operating system that performs a method for enabling transacted operations on one or more system resources, the method comprising the steps of:

returning a transaction to a transaction client responsively to a request to perform the transaction;

exposing one or more name-based transacted functions to the transaction client through an application programming interface, the name-based transacted functions using fully ACID (atomic, consistent, isolated, durable) semantics and the name-based transacted functions arranged for performing the transacted operations on the one or more system resources only when taking a filename as an explicit parameter;

creating a reference to the transaction which is bound to the transaction in response to a call to the one or more transacted functions; and receiving the transaction as a parameter to the one or more transacted functions.

17. The computer-readable storage medium of claim 16 in which the transaction reference is selected from one of pointer, handle, name, or object that enables the transaction to be looked up.

18. The computer-readable storage medium of claim 16 in which the method includes a further step of transacting any operation that is performed on the transaction using the reference.

19. The computer-readable storage medium of claim 16 in which the system resource includes a kernel object.

20. The computer-readable storage medium of claim 19 in which the kernel object includes at least one of file system or registry.

* * * * *